Aug. 2, 1960  G. A. LYON  2,947,576
WHEEL COVER
Filed June 14, 1957  3 Sheets-Sheet 1
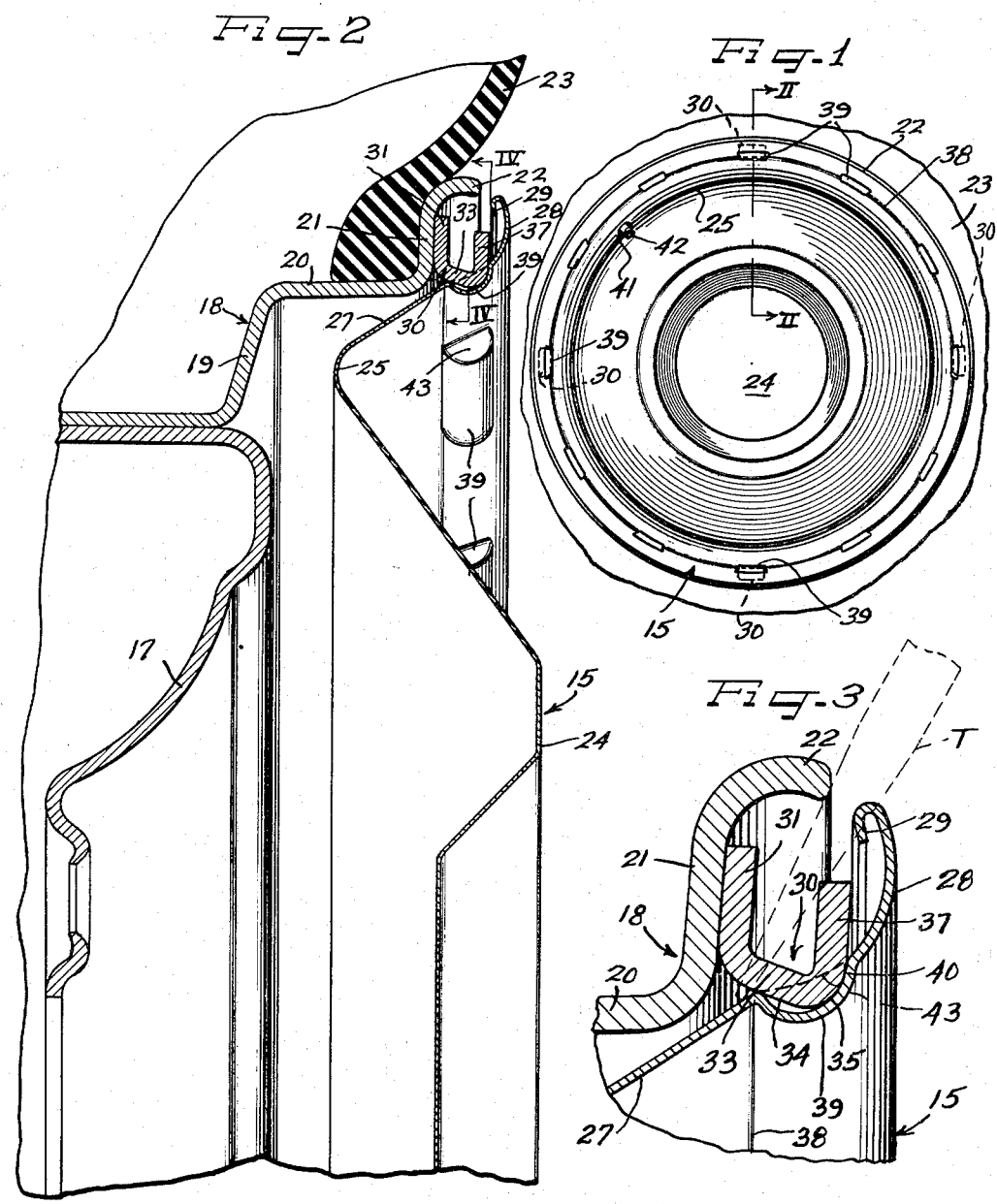
Inventor
GEORGE ALBERT LYON Aug. 2, 1960
G. A. LYON
2,947,576
WHEEL COVER
Filed June 14, 1957
3 Sheets-Sheet 2
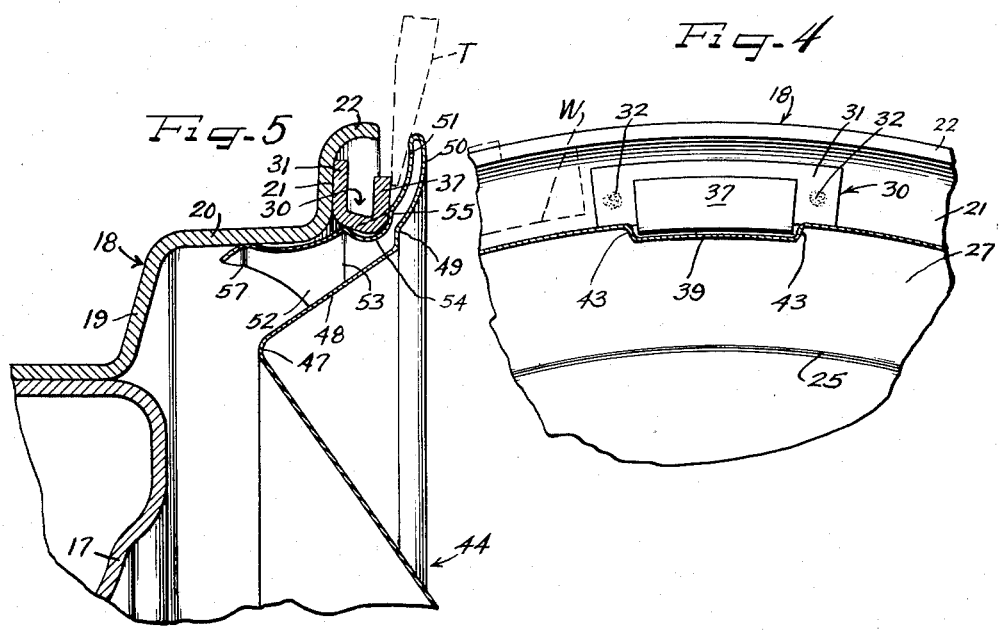
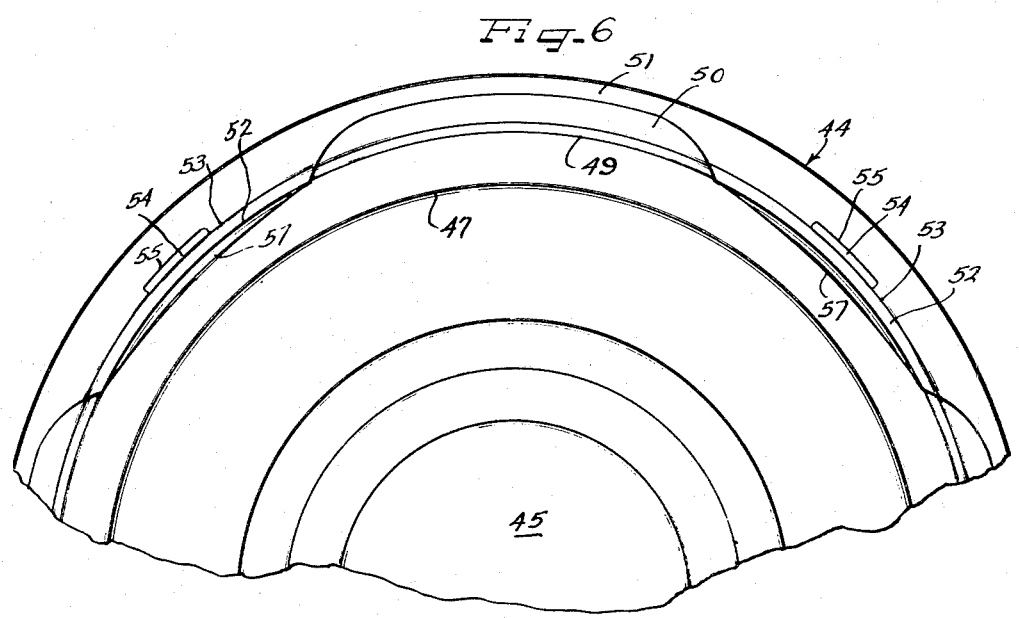
Inventor
GEORGE ALBERT LYON

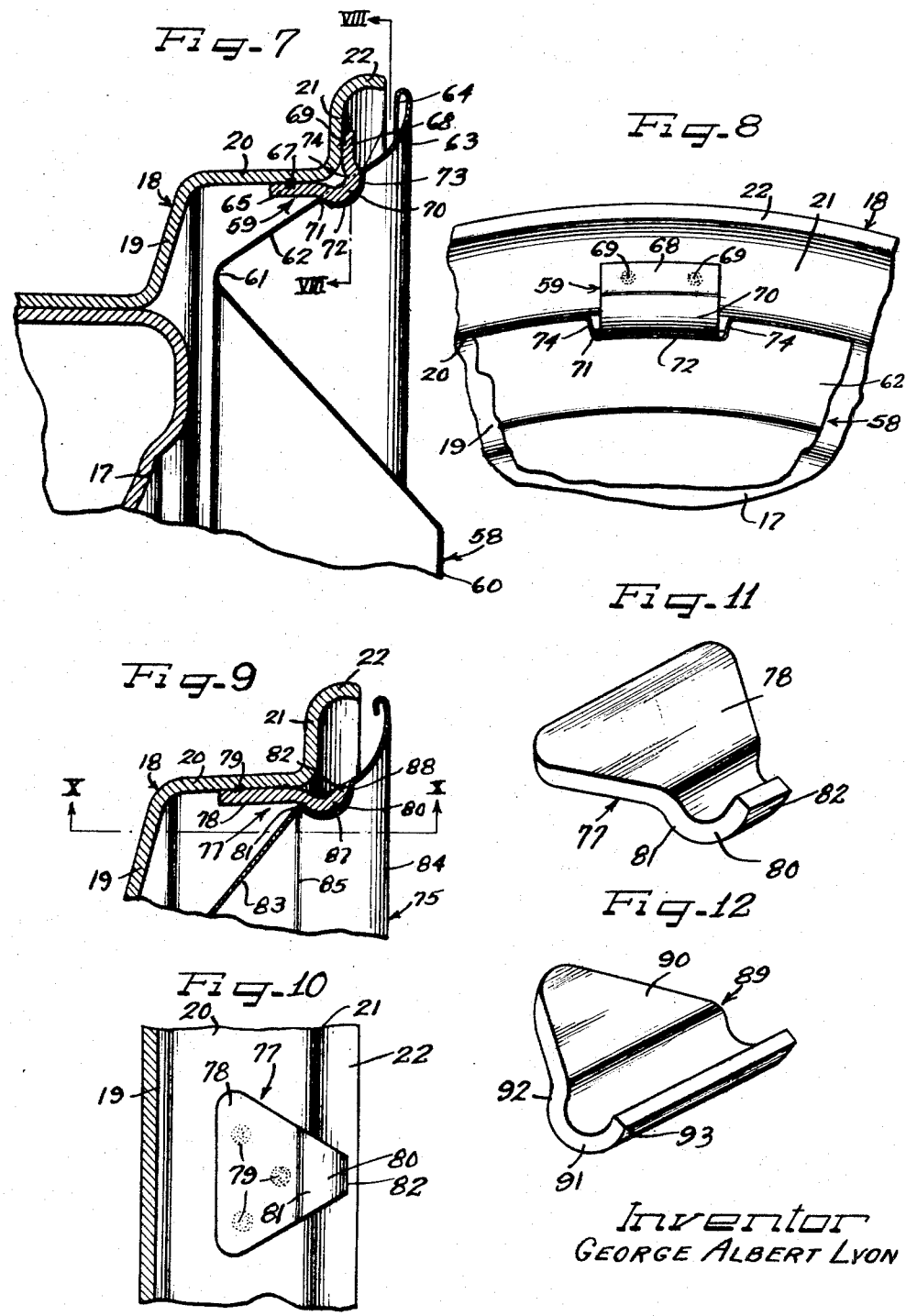

United States Patent Office 2,947,576
Patented Aug. 2, 1960

2,947,576

WHEEL COVER

George Albert Lyon, 13881 W. Chicago Blvd., Detroit 28, Mich.

Filed June 14, 1957, Ser. No. 665,805

6 Claims. (Cl. 301—37)

The present invention relates to improvements in wheel structures and more particularly concerns the protective and ornamental covering of the outer sides of vehicle wheels.

An important object of the present invention is to provide improved means in a wheel structure for retaining wheel covers in place on the outer sides of the wheels.

Another object of the invention is to provide a novel supported relationship of a wheel cover at the outer side of a vehicle wheel.

A further object of the invention is to provide improved welded-on cover retaining means for tire rims of vehicle wheels.

A further object of the invention is to provide improved means for tire rims of vehicle wheels especially adapted for tubeless tires, for retaining covers on the outer sides of the wheels.

Still another object of the invention is to provide for low cost wheel covers by affording retaining means with which the covers are engageable in a simplified, novel manner.

Yet another object of the invention is to provide improved wheel structure having cover retaining means of novel construction by which theft of wheel covers can be discouraged.

It is still another object of the invention to provide an improved cover construction for disposition at the outer side of a vehicle wheel.

Other objects, features and advantages of the present invention will be readily apparent from the following detailed description of certain preferred embodiments thereof taken in conjunction with the accompanying drawings, in which:

Figure 1 is an outer side elevational view of a wheel structure embodying features of the invention;

Figure 2 is a radial sectional view on an enlarged scale taken substantially on the line II—II of Figure 1;

Figure 3 is an enlarged fragmentary sectional view taken substantially in the same plane as Figure 2 but showing the tire rim and cover retaining means and cover in larger detail;

Figure 4 is a fragmentary sectional elevational detail view taken substantially on the line IV—IV of Figure 2;

Figure 5 is a fragmentary radial sectional detail view of the wheel taken substantially in the same plane as Figure 2 but showing a modified form of the cover;

Figure 6 is a fragmentary rear elevational view of the cover of Figure 5;

Figure 7 is a fragmentary radial sectional detail view of a modified wheel structure;

Figure 8 is a fragmentary sectional elevational detail view taken substantially on the line VIII—VIII of Figure 7;

Figure 9 is a fragmentary radial sectional detail view through a further modification of the wheel structure;

Figure 10 is a fragmentary sectional elevational detail view taken substantially on the line X—X of Figure 9;

Figure 11 is an isometric view of a cover retaining weld-on plate or lug of the kind shown in Figures 9 and 10; and Figure 12 is an isometric view of a modification of the weld-on retaining plate or a lug.

In Figures 1–4, a wheel cover 15 is constructed and arranged for press-on, pry-off disposition at the outer side of a vehicle wheel such as an automobile wheel including a disk spider wheel body 17 supporting a multiflange, drop center tire rim 18 which includes a generally axially outwardly facing side flange 19 joining a generally axially outwardly extending and radially inwardly facing intermediate flange 20 from which extends a generally radially outwardly and then axially outwardly extending terminal flange having a base or radially extending inner portion 21 and a lip portion 22. A pneumatic tire 23 of the tubeless variety is adapted to be supported by the tire rim.

Herein the cover 15 is preferably in the form of a circular disk dimensioned to substantially entirely overlie the wheel inclusive of the wheel body 17 and the tire rim 18. To this end, the cover includes a central crown portion 24 which is adapted to overlie the central bolt-on flange portion of the wheel body, and with the side wall of the crown portion sloping generally axially inwardly and radially outwardly into an annular axially inwardly depressed or dished portion 25 adapted to overlie the side wall 19 of the tire rim while the radially outer portion of the dished intermediate cover portion 25 is provided by a generally radially and axially outwardly sloping radially outer side wall section or flange portion 27 adapted to be disposed in generally spaced telescoped relation to the intermediate flange 20 of the tire rim and the juncture between the intermediate flange and the terminal flange portion 21. At its radially outer extremity, the circular cover member has extending generally axially outwardly and turned radially outwardly an annular marginal portion 28 for overlying the terminal flange 21, 22 in spaced relation. At its outer extremity, the marginal portion 28 is provided with an underturned reinforcing and finishing narrow flange 29.

For retaining the cover 15 on the outer side of the wheel, means are provided which will also support the cover entirely spaced from the wheel. To this end, cover retaining members or lugs 30 are carried by the tire rim and are retainingly engageable by retaining shoulder means on the cover. In a preferred arrangement, there are four of the retaining lug members 30 (Fig. 1) equidistantly spaced circumferentially on the tire rim.

Each of the cover retaining lug members 30 includes a base flange 31 which adjacent to its opposite ends may be secured by spot welding 32 to the axially outwardly facing surface of the terminal flange portion 21 (Fig. 4). Extending generally axially outwardly and radially inwardly from the inner edge of the base flange 21 is an integral shoulder flange 33 providing a generally axially and radially inwardly facing generally undercut shoulder 34. Joining the shoulder flange 33 on a rounded juncture 35 is a lead-in and guard flange 37 projecting generally radially outwardly and sloping slightly generally axially inwardly toward the juncture nose or projection 35 of the lug member. In a preferred form, the retaining lug members 30 may be shaped from mild heavy gauge steel stock or other material having the same easy working characteristics.

For retaining engagement with the retaining shoulders 34 of the retaining lug members 30, the cover 15 is provided with shoulder means, in this instance in the form of an annular continuous resilient shoulder 38 indented generally radially outwardly at juncture of the cover portions 27 and 28. Whereas the retaining shoulder 38 might, if prepared, be formed at the axially inner side of a continuous annular radially outwardly opening groove, it is preferably provided as a common shoulder at the axially inner sides of radially inward embossments 39 opening generally radially outwardly in the marginal cover portion 28 immediately adjacent to the rib shoulder 38 and circumferentially spaced to provide pockets or sockets matching the spacing and receptive of the four retaining lug members 30 or any preferred number of the lugs that may be provided. For ornamental purposes, there may be additional of the socket embossments 39 between the actual lug engaging embossments so as to provide a pleasing, symmetrical pattern.

The construction and relationship of the socket embossments 39 with respect to the retaining lug members 30 is such that with the nose portions 35 of the retaining lug members received in the respective sockets 39 and with the shoulder portions 38 at the axially inner sides of the embossment sockets retainingly engaging the retaining lug shoulders 34, a generally axially inwardly facing shoulder 40 at the axially outer side of each of the lug-engaging sockets engages upon the axially outer side of the associated lug and more particularly upon the axially outer side of the nose projection 35 thereof. The distance between the retaining rib shoulder 38 and the seating shoulder 40 is slightly less than the corresponding distance between the surfaces of the retaining lug member 30 respectively engaged by the cover shoulders so that there is a gripping more or less clamping, pinching coaction of the cover shoulders with respect to the portion of the retaining lug member in each instance projecting into the respective cover socket. This assures a rattle-free interengagement of the cover with the retaining lug members. In addition, the cover is supported in entirely spaced relation to the wheel including the wheel body and the tire rim and more particularly the juncture shoulder between the terminal flange portion 21 and the intermediate flange 20 adjacent to the retaining lug shoulder 34, as best seen in Figures 2 and 3. Also, the marginal portion 28 of the cover is supported in fully spaced relation to the terminal flange and with the reinforced extremity 29 of the cover spaced from the tip of the terminal flange lip 22 for thereby providing an ample chamber behind the cover margin to receive a wheel balancing weight W (Fig. 4) or a plurality of such weights as required. It will be appreciated, of course, that the retaining lug members 30 themselves afford some wheel balancing advantage due to their mass and their location adjacent the peripheral extremity of the wheel, and the symmetrically spaced disposition of the lug members.

In applying the cover 15 to the outer side of the wheel, a valve stem aperture 41 in the intermediate dished portion 25 of the cover is registered with and receives therethrough a valve stem 42. By having the valve stem aperture 41 and the valve stem 42 located equidistantly between two of the retaining lugs 30 as best seen in Fig. 1, the act of registering the valve stem through the valve stem aperture generally registers the adjacent two retaining lug members 30 with the corresponding retaining socket embossments 39 of the cover. Then to complete application of the cover to the wheel, the opposite side of the cover is pressed axially inwardly until the retaining shoulder 38 at the inner sides of the socket embossments 39 corresponding to the remaining two retaining lug members 30 cam resiliently over the retaining lug nose shoulders 35 and snap into engagement behind and with the shoulder 34 of the retaining lug member. Such snapping of the retaining rib shoulder 38 into engagement with the retaining lug shoulder is facilitated by the generally axially extending and generally radially outwardly facing disposition of the radially inner portion of the cover marginal portion 28 and the generally radially facing disposition of the cover flange section 27 enabling substantial radial flexing of the portions of the cover adjacent to the retaining shoulder rib 38 as the same is cammed over and past the nose projection 35 of the associated retaining lug member which is disposed on a smaller diameter circle than the diameter of the retaining shoulder 38 of the cover. In the fully applied relationship of the cover to the wheel, it is held centered and against displacement both axially and transversely. At the same time, the cover flange portion 27 and the marginal portion 28 are maintained in spaced relation to the tire rim so as to afford an escape gap for dirt or water that may work in behind the cover.

For removing the cover from the outer side of the wheel, a pry-off tool T (Fig. 3) is engaged behind the cover marginal portion 28 and past the tip of the terminal flange lip portion 22 and the cover terminal portion 29 and the tip of the tool is engaged behind the cover shoulder rib 38, preferably adjacent to one of the retaining lug members 30. Pry-off leverage exerted generally axially outwardly and radially inwardly by the pry-off tool against the cover rib shoulder 38 effects generally radially inward resilient flexing of the engaged portion of the cover and axially outward camming of the lug shoulder engaging portion of the rib shoulder 38 until the same has snapped axially outwardly past the lug member nose 35.

On the wheel, turning of the cover relative to the wheel is prevented and thus distortion or misalignment of the valve stem 42 with respect to the valve stem aperture 41 is avoided by the turn-preventing opposition of end walls 43 defining the embossments 39 with respect to the adjacent ends of the retaining lug members 30 and more particularly at the circumferentially opposite sides or ends of the nose portion 35 thereof. Any tendency of the cover to turn due to torque forces or stresses is thus prevented by the shouldering of the embossment end walls or stop shoulders against the opposing edges or surfaces or shoulders of the retaining lug members.

In Figures 5 and 6, a cover 44 is shown which is constructed and arranged to be applied to the outer side of the same wheel as shown in Figure 2 and for that reason all of the parts of the wheel in Figure 5 are identified by the same reference numerals, inclusive of the cover retaining lug member 30 which is also substantially the same. In this instance, the cover 44 is of the full disk type including a central or crown portion 45 having the side wall thereof merging into an annular intermediate dished portion 47 the outer side wall of which provides an annular cover flange 48 extending generally radially and axially outwardly and arranged for substantial spaced telescoped disposition relative to the tire rim intermediate flange 20 and the terminal flange. At its axially outer side the cover flange portion 48 merges on a stepped reinforcing annular rib shoulder 49 with a generally radially outwardly extending arched cover marginal portion 50. An underturned flange 51 at the extremity of the marginal portion 50 reinforces and finishes the edge of the cover.

For retaining the cover 44 in place on the wheel in association with the retaining lug members 30, a circumferentially spaced series of cover retaining fingers 52 is provided as integral extensions from the underturned flange 51 and may be derived from material that comprises for corners of a quadrangular blank and would otherwise comprise waste from the blank if trimmed off. Each of the fingers 52 has intermediately its length a transverse radially outwardly indented shoulder rib 53 engageable behind the retaining shoulder of the retaining lug member 30, a generally radially inwardly projecting embossment 54 being provided axially outwardly adjacent to the retaining rib shoulder 53 for reception of the nose portion of the retaining lug member, with a seating shoulder 55 provided at the axially outer side of the embossment socket for engagement upon the nose portion of the retaining lug member. Through this arrangement, the cover is supported in spaced relation to the wheel and is held against axial displacement relative to the wheel.

Axially inwardly from the retaining rib shoulder 53 of the retaining finger, the body of the finger extends generally axially inwardly into opposed adjacent relation to the intermediate flange 20 of the tire rim and has a turned teminal portion 57 adapted to engage against the intermediate flange for effecting a stabilized engagement and retention of the cover and resisting any tendency toward rocking of the retaining fingers about the noses of the respective retaining lug members 30 and thus radial deflection of the cover due to road shocks or the like. Since the terminal portion 57 of the fingers turns generally radially inwardly it also assists in inward camming of the fingers and avoids catching of the tip of the fingers on the rim incident to application of the cover to the wheel. It will also be observed that the retaining fingers 52 are spaced generally radially outwardly relative to the adjacent portions of the cover so as to enable the fingers to flex resiliently radially relative to the cover.

In applying the cover 44 to the outer side of the wheel, substantially the same procedure is followed as described in connection with the cover 15, and the retaining fingers 52 snap into engagement with the retaining lug members 30 by camming of the retaining shoulder ribs 53 of the fingers over the nose portions of the retaining lugs.

For removing the cover from the wheel, the preferred procedure is to apply a pry-off tool T behind the outer margin of the cover and into a gap provided between the axially outer portion of one of the retaining fingers and the guard and lead-in flange 37 that overlies the base flange 31 of the retaining lug member. Thereupon pry-off leverage exerted against the retaining lug member flange 37 and the underturned margin flange portion 51 of the cover causes the retaining finger to be snapped free from the retaining lug member and the cover thus released from the wheel.

If the pry-off tool is applied between the fingers 52, then it may engage the stepped reinforcing shoulder rib 49 which thus serves as a pry-off shoulder.

The opposite ends of the sockets provided by the embossments 54 of the retaining fingers oppose the opposite sides of the ertaining lugs and thus retain the cover against turning on the wheel.

In Figures 7 and 8 is shown a modification wherein the wheel itself is substantially the same as in Figures 2 and 5, similar reference numerals being employed to identify the same parts, but a slightly modified form of cover 58 is provided retained in press-on, pry-off relation on the wheel by means of modified cover retaining lug members 59.

The cover 58 includes a central crown portion 60 the side wall of which merges with an annular inwardly indented generally dished intermediate portion 61 having a side wall annular flange 62 directed generally axially and radially outwardly for spaced telescoped disposition relative to the intermediate flange 20 of the tire rim and merging with an arched annular outer marginal portion 63 of the cover having an underturned reinforcing and finishing flange 64 adapted in the assembly with the wheel to lie in spaced adjacency to the tip of the terminal flange lip 22.

In this instance, the cover retaining lugs 59 are in each instance of generally L-shape cross-section provided with respective axially inwardly extending flange leg 65 attached as by welding 67 to the axially outer portion of the intermediate flange 20, and a generally radially outwardly extending flange leg 68 attached as by means of welding 69 to the terminal flange portion 21. Between the flanges 65 and 68 is a juncture shoulder hump 70 providing a cover retaining projection spaced generally axially outwardly and radially inwardly relative to the adjacent juncture between the intermediate flange 20 and the terminal flange portion 21 and affording a generally radially and axially inwardly facing shoulder and a generally axially outwardly facing shoulder.

For retaining engagement of the cover with the retaining shoulder projection 70 of the retaining lug member 59 in each instance, a cover retaining shoulder 71 is provided at the radially inner side of a socket embossment 72 projecting generally axially outwardly and radially inwardly in the cover flange portion 62 adjacent juncture thereof with the marginal portion 63 of the cover, and defined at the axially outer side by a seating shoulder 73. Since the retaining lug member nose portion 70 is rounded transversely on a substantial radius, and the cover portion 62 is disposed on a relatively sharp oblique angle to the axis of the cover and the wheel, and preferably substantially normal to an axis common to the tips of the juncture between the rim flanges 20 and 21 and the tip of the lug nose portion 70, resilient flexibility of the cover in the vicinity of the retaining shoulder 71 enables relatively easy flexing thereof in the application and removal of the cover relative to the retaining and supporting lug members 59.

Application of the cover 58 to the outer side of the wheel is effected substantially the same as described in connection with the covers 15 and 44 in that a valve stem aperture (not shown) is registered with the usual valve stem of the wheel and at the same time an adjacent pair of the retaining lug members 59 is thereby engaged within corresponding embossment sockets 72. Then the remainder of the cover is pressed axially inwardly until the remaining retaining shoulders 71 of the cover snap past the radially inward projection of the retaining lug nose 70 and into engagement with the generally radially and axially inwardly facing retaining shoulders of the retaining lug members and engagement of the seating shoulders 73 against the axially facing portions of the projections or crowns of the retaining lug members. In the fully seated relationship of the cover, it is entirely supported by the nose portions 70 of the retaining lug members, with a gap between the radially outer portion 62 of the cover and the tire rim, and with the outer marginal portion 63 of the cover held in chambered gap relation to the terminal flange portions 21 and 22 for accommodating wheel balancing weights.

Removal of the cover from the outer side of the wheel is readily effected by inserting a pry-off tool such as a screwdriver or the like behind the outer marginal portion 63 of the cover and into engagement with the seating shoulder 73 of any selected one of the retaining sockets of the cover and applying pry-off leverage. Since the retaining lug leg flange 68 is inset relative to the adjacent portion of the retaining lug bulge nose 70, it will serve readily as a guide for the tip of the pry-off tool toward the bulge portion 70 and then to the seating and pry-off shoulder 73.

It may be noted that the retaining lug member 59 is simple to assemble with the tire rim since it has the two angularly related flange legs 65 and 68 providing therebetween a reentrant corner receptive of the angular juncture between the rim flange portions 20 and 21. Thereby seating of the retaining lug member 59 incident to assembly with the tire rim is a simple matter. Although both of the flange legs are shown as welded in place, it will be clear that if preferred only one of such legs may be welded on, the other one serving as a locating, reinforcing and stabilizing leg in engagement with the tire rim. This form of the retaining lug structure also lends itself readily to being rolled as a section and then portions of the desired substantial width severed from a rolled strip or bar.

Turning of the cover 58 on the wheel is precluded by shoulders 74 at the circumferentially opposite sides of the socket embossment 72 opposing the respective opposite ends of the associated retaining lug member 59 and more particularly the shoulder bulge nose portion 70 thereof.

In Figures 9, 10 and 11 is shown a modification wherein the wheel is substantially the same as the wheel shown in connection with the other forms of the invention already described, but a cover 75 only slightly different from the cover 15 is applied in snap-on, pry-off relation to the outer side of the wheel in retained, supported engagement with retaining lug means comprising in each instance a member 77 which is carried by the tire rim on the inner face of the intermediate flange 20 adjacent to juncture with the terminal flange portion 21. As best seen in Figs. 10 and 11, the retaining lug member 77 may be generally in the form of a plate of substantially triangular outline having, in this instance a flat base or body portion 78 of substantial dimensions secured as by means of spot welding 79 to the rim flange 20.

One of the angle portions of the generally triangular retaining lug member 77 is formed to provide a generally radially inwardly bowed or arched retaining lug head or shoulder terminal portion 80 providing at its axially inner side a cover retaining shoulder 81 and at its axially outer extremity portion a seat shoulder 82. The retaining lug member 77 is mounted on the tire rim with the retaining shoulder projection head portion 80 extending axially outwardly beyond the juncture of the tire rim flange portions 20 and 21 and also projecting radially inwardly in inset relation to the radially inner face of the body portion 78.

The cover 75 may be provided with a central crown portion and an intermediate dished portion (not shown) similar to the cover 15, with a radially outer generally radially and axially outwardly oblique portion 83, joining an outer marginal generally axially outwardly and then radially outwardly turned outer marginal flange portion 84 of the cover, and having an annular reinforcing and cover retaining rib shoulder 85 that projects generally radially outwardly for engagement with and behind the retaining lug shoulder 81. A generally radially inwardly pressed embossment 87 in the radially inner portion of the cover marginal portion 84 adjacent to the retaining shoulder 85 provides a socket receptive of the retaining lug member head 80. At the axially outer side of the socket or pocket embossment 87 is a seating shoulder 88. Application of the cover 75 is adapted to be effected in the same manner as described in connection with the covers 15, 44 and 58, with the retaining rib shoulder 85 of the cover 75 resiliently flexible for snapping on and off relative to the retaining lug shoulder portions 80. A pry-off tool is adapted to be applied behind the outer marginal portion 84 of the cover into engagement with the retaining shoulder 85 which thus also serves as a pry-off shoulder. It will be observed that the cover in its wheel covering, attached relationship is supported entirely by the retaining lug shoulder head portions 80 with the cover shoulder 85 disposed in gap relation to the adjacent juncture of the tire rim flanges 20 and 21, thus not only facilitating insertion of a pry-off tool tip into engagement with the shoulder 85, but also affording a dirt and water escape gap. The outer marginal portion 84 of the cover is maintained in chamber gap relation to the tire rim terminal flange 21, 22 for ready reception of balancing weights therebehind and substantially concealed by the marginal portion 84.

In Figure 12 is shown a modification of the retaining lug structure comprising a plate lug member 89 having a generally triangular outline with a narrowing corner end portion providing a flat body 90 engageable against the inner face of the intermediate flange of the tire rim to be secured thereto as by welding, and with an opposite wide portion of the lug member providing an arched retaining shoulder head portion 91 of substantial length and affording a generally axailly inwardly directed cover retaining shoulder 92 and an opposite generally axially outwardly facing cover receiving seat 93. Except for differences in relative proportions of the body 90 and the retaining shoulder hump head 91, function of the retaining lug member 89 and its structural relationship to the tire rim and the cover may be substantially the same as described in connection with the retaining lug member 77.

It may be observed that the several modifications of the present invention afford a substantial range of flexibility and adaptability with respect to various practical requirements and service conditions as well as preferences with respect to cover design to distinguish various makes or models of automobile wheel covers. For this purpose, the several retaining lug structures and the several cover forms may be in at least various of the forms interchanged.

All of the covers disclosed may be made from suitable sheet material such as stainless steel, brass, suitable aluminum alloy or the like, made by means of suitable press equipment. By virtue of the minimum material requirements for the covers a favorable low cost factor is attained.

Since the tire rim is in no instance pressed to provide retaining shoulder structure and the retaining lug members of the present invention are all adapted to be secured externally of the tire rim as by welding an especially favorable structure with respect to tubeless tires is provided.

It will be appreciated, also, that since the retaining lug members are attached to the tire rim substantial range of dimensional and relative location and diametrical disposition alternatives or choices or variables may be provided for with respect to various automobile makes or models for effecting exclusiveness of cover and retaining lug combinations to thereby avoid exchangeability of covers and discourage theft.

It will be understood that modifications and variations may be effected without departing from the scope of the novel concepts of the present invention.

I claim as my invention:

1. In a wheel structure including a wheel body and a tire rim supported thereby and provided with an intermediate flange facing generally radially inwardly and a terminal flange having a portion thereof extending generally radially outwardly from the axially outer end of the intermediate flange an facing generally axially outwardly, a cover retaining lug structure carried by said terminal flange portion and projecting generally axially outwardly therefrom adjacent to juncture of the intermediate and terminal flanges, said lug structure providing in axially outwardly spaced relation to the terminal flange portion a shoulder structure including a generally radially and axially inwardly facing shoulder and a generally axially outwardly facing shoulder spaced axially outwardly therefrom, and a cover for disposition over the outer side of the wheel having axially spaced retaining shoulders engageable in press-on, pry-off relation with said lug structure shoulders comprising a retaining shoulder engageable with said radially and axially inwardly facing shoulder of the lug structure and a seating shoulder for engaging with said generally axially outwardly facing shoulder of the lug structure and thereby supporting the wheel cover in spaced relation to the wheel body and the tire rim and retained against unintentional axial displacement from the wheel.

2. In a wheel structure including a wheel body and a tire rim supported thereby and provided with an intermediate flange facing generally radially inwardly and a terminal flange having a portion thereof extending generally radially outwardly from the axially outer end of the intermediate flange and facing generally axially outwardly, a cover retaining lug structure carried by said terminal flange portion and projecting generally axially outwardly therefrom adjacent to juncture of the intermediate and terminal flanges, said lug structure providing in axially outwardly spaced relation to the terminal flange portion a shoulder structure including a generally radially and axially inwardly facing shoulder and a generally axially outwardly facing shoulder spaced axially outwardly therefrom, and a cover for disposition over the outer side of the wheel having axially spaced retaining shoulders engageable in press-off, pry-off relation with said lug structure shoulders comprising a retaining shoulder engageable with said radially and axially inwardly facing shoulder of the lug structure and a seating shoulder for engaging with said generally axially outwardly facing shoulder of the lug structure and thereby supporting the wheel cover in spaced relation to the wheel body and the tire rim and retained against unintentional axial displacement from the wheel, said retaining lug structure having an additional portion thereof engaged with the intermediate flange adjacent to said juncture.

3. In a wheel structure including a wheel body and a tire rim supported thereby and provided with an intermediate flange facing generally radially inwardly and a terminal flange having a portion thereof extending generally radially outwardly from the axially outer end of the intermediate flange and facing generally axially outwardly, a cover retaining lug structure carried by said intermediate flange and projecting generally axially outwardly beyond the juncture of the intermediate and terminal flanges, said lug structure providing in generally axially outwardly spaced relation to the intermediate flange a shoulder structure including a generally radially and axially inwardly facing retaining shoulder and having a generally axially outwardly facing seat shoulder spaced axially outwardly from said terminal flange portion, and a cover for disposition over the outer side of the wheel having axially spaced retaining shoulders engageable in press-on-pry-off relation with said shoulder structure and having a retaining shoulder engageable with said retaining shoulder of the lug structure and a seating shoulder for engaging with said seat shoulder of the lug structure and thereby supporting the wheel cover in spaced relation to the wheel body and the tire rim and retained against unintentional axial displacement from the wheel.

4. In a wheel structure including a wheel body and a tire rim supported thereby and provided with an intermediate flange facing generally radially inwardly and a terminal flange having a portion thereof extending generally radially outwardly from the axially outer end of the intermediate flange and facing generally axially outwardly, a cover retaining lug structure carried by both said intermediate flange and said terminal flange portion and having a shoulder hump projecting generally axially outwardly and radially inwardly from the juncture of the intermediate and terminal flanges, said shoulder hump providing in axially outwardly spaced relation to the intermediate flange a generally radially and axially inwardly facing retaining shoulder and having a generally axially outwardly facing seat shoulder spaced axially outwardly from said terminal flange portion, and a cover for disposition over the outer side of the wheel having axially spaced retaining shoulders engageable in press-on, pry-off relation with said shoulder structure and having a retaining shoulder engageable with said retaining shoulder of the lug structure and a seating shoulder for engaging with said seat shoulder of the lug structure, whereby the shoulder hump supports the wheel cover in spaced relation to the wheel body and the tire rim and retained against unintentional axial displacement from the wheel, said retaining lug structure also having a portion thereof in engagement with the terminal flange portion.

5. In a wheel structure including a tire rim having an intermediate generally radially inwardly facing annular flange and a terminal flange joined to the axially outer portion of the intermediate flange and provided with a portion that extends generally radially outwardly and faces axially outwardly, the tire rim having welded thereto adjacent juncture of the intermediate and terminal flanges a flanged retaining lug structure providing a turned shoulder portion projecting generally over and beyond said juncture and providing cover retaining shoulder thereon, said turned portion comprising an intermediate juncture between angularly related flanges one of which is engaged against the terminal flange portion and the other of which is engaged against the intermediate flange and with the turned portion spaced from said rim flange juncture.

6. In a wheel structure including a tire rim having terminal and intermediate flanges joined on a generally radially inwardly and axially outwardly facing juncture shoulder, a cover retaining lug structure having a flange welded to the intermediate flange adjacent to said juncture shoulder and having a turned cover retaining shoulder portion projecting generally axially outwardly and bulging generally radially inwardly beyond and relative to said juncture shoulder so as to support a wheel cover in spaced relation to the juncture shoulder, said turned lug shoulder portion having projecting generally radially therefrom a flange which is welded to the terminal flange.

References Cited in the file of this patent

UNITED STATES PATENTS

| | | |
|---|---|---|
| 2,076,789 | LeJeune | Apr. 13, 1937 |
| 2,113,541 | Blank | Apr. 5, 1938 |
| 2,327,044 | Horn | Aug. 17, 1943 |
| 2,561,160 | Weasler | July 17, 1951 |
| 2,621,978 | Lyon | Dec. 16, 1952 |
| 2,624,640 | Lyon | Jan. 6, 1953 |
| 2,631,066 | Horn | Mar. 10, 1953 |
| 2,669,487 | Horn | Feb. 16, 1954 |
| 2,683,631 | Lyon | July 13, 1954 |

FOREIGN PATENTS

| | | |
|---|---|---|
| 1,100,164 | France | Mar. 30, 1955 |
| 774,837 | Great Britain | Feb. 15, 1956 |